United States Patent
Lee

(10) Patent No.: US 8,189,947 B2
(45) Date of Patent: May 29, 2012

(54) IMAGE EDGE CORRECTION APPARATUS AND METHOD

(75) Inventor: Myung-Soo Lee, Seoul (KR)

(73) Assignee: Core Logic, Inc., Seoul (KR)

( * ) Notice: Subject to any disclaimer, the term of this patent is extended or adjusted under 35 U.S.C. 154(b) by 1034 days.

(21) Appl. No.: 12/156,419

(22) Filed: May 30, 2008

(65) Prior Publication Data
US 2008/0298714 A1    Dec. 4, 2008

(30) Foreign Application Priority Data
May 31, 2007  (KR) .................. 10-2007-0053105

(51) Int. Cl.
*G06K 9/40* (2006.01)
(52) U.S. Cl. ........................................ 382/266
(58) Field of Classification Search ........... 382/254–275
See application file for complete search history.

(56) References Cited

U.S. PATENT DOCUMENTS

| | | | | |
|---|---|---|---|---|
| 6,268,933 B1* | 7/2001 | Kim | | 358/1.9 |
| 7,127,122 B2* | 10/2006 | Ogata et al. | | 382/260 |
| 7,551,795 B2* | 6/2009 | Xu et al. | | 382/264 |
| 2005/0099537 A1* | 5/2005 | Zhu | | 348/450 |
| 2005/0219390 A1* | 10/2005 | Tajima et al. | | 348/246 |
| 2007/0110329 A1* | 5/2007 | Moon et al. | | 382/261 |
| 2007/0188525 A1* | 8/2007 | Yamanaka et al. | | 345/690 |
| 2008/0298714 A1* | 12/2008 | Lee | | 382/266 |
| 2009/0245676 A1* | 10/2009 | Zhu | | 382/254 |

FOREIGN PATENT DOCUMENTS

| | | |
|---|---|---|
| KR | 10-2005-0121148 | 12/2005 |
| KR | 10-2006-0098809 | 9/2006 |

* cited by examiner

*Primary Examiner* — Jingge Wu
(74) *Attorney, Agent, or Firm* — Edwards Wildman Palmer LLP

(57) ABSTRACT

Provided is an image edge correction apparatus and method. The image edge correction apparatus includes an edge information extraction unit extracting edge information of an input image based on luminance change directivity information of the input image and an edge enhancement unit enhancing an edge of the input image by applying different luminance weights to a pixel of interest included in the input image based on the edge information of the input image. Thus, by appropriately enhancing a contour portion of an image while minimizing noise in a plane portion of the image, the sharpness of the image can be improved.

21 Claims, 9 Drawing Sheets

FIG. 3

| Y11 | Y12 | Y13 | Y14 | Y15 |
|---|---|---|---|---|
| Y21 | Y22 | Y23 | Y24 | Y25 |
| Y31 | Y32 | Y33 | Y34 | Y35 |
| Y41 | Y42 | Y43 | Y44 | Y45 |
| Y51 | Y52 | Y53 | Y54 | Y55 |

PA1

| P11 | P12 | P13 |
|---|---|---|
| P21 | P22 | P23 |
| P31 | P32 | P33 |

PA2

$$H = 2|SB21-SB23| + |2SB22-SB21-SB23|$$

$$V = 2|SB12-SB32| + |2SB22-SB12-SB32|$$

$$S = 2|SB13-SB31| + |2SB22-SB13-SB31|$$

$$B = 2|SB11-SB33| + |2SB22-SB11-SB33|$$

BF PA1

PA4

| -1 | 0 | -1 | 0 | -1 |
|---|---|---|---|---|
| 0 | -1 | -1 | -1 | 0 |
| -1 | -1 | 16 | -1 | -1 |
| 0 | -1 | -1 | -1 | 0 |
| -1 | 0 | -1 | 0 | -1 |

EBF

| Y11 | Y12 | Y13 | Y14 | Y15 |
|---|---|---|---|---|
| Y21 | Y22 | Y23 | Y24 | Y25 |
| Y31 | Y32 | Y33 | Y34 | Y35 |
| Y41 | Y42 | Y43 | Y44 | Y45 |
| Y51 | Y52 | Y53 | Y54 | Y55 |

PA1

| EB11 | EB12 | EB13 | EB14 | EB15 |
|---|---|---|---|---|
| EB21 | EB22 | EB23 | EB24 | EB25 |
| EB31 | EB32 | EB33 | EB34 | EB35 |
| EB41 | EB42 | EB43 | EB44 | EB45 |
| EB51 | EB52 | EB53 | EB54 | EB55 |

EB

IMAGE EDGE CORRECTION APPARATUS AND METHOD

CROSS-REFERENCE TO RELATED PATENT APPLICATION

This application claims the benefit of Korean Patent Application No. 10-2007-0053105, filed on May 31, 2007, in the Korean Intellectual Property Office, the disclosure of which is incorporated herein in its entirety by reference.

BACKGROUND OF THE INVENTION

1. Field of the Invention

The present invention generally relates to an image edge correction apparatus and method, and more particularly, to an image edge correction apparatus and method whereby the contour of an edge portion of an image is enhanced while reducing noise in a plane portion of the image.

2. Description of the Related Art

Generally, an image captured by a digital camera for a cellular phone or a low-pixel popular digital camera is not clear due to a small-size image sensor, a small-size lens, and a simplified function of an image processing integrated circuit (IC) for cost reduction. In particular, the edge of a subject included in an output image, i.e., the contour of the image is blurred. The contour of the image means an outline where the position, shape, and size of an object change. The contour of the image contains much information about the image and exists in a position where the brightness of the image changes from a low value to a high value or vice versa. To solve blur in the contour of the image, edge enhancement has been suggested.

FIG. 1 is a flowchart conceptually illustrating a conventional edge sharpening method for edge enhancement.

As illustrated in FIG. 1, in the conventional edge sharpening method, an image signal is received in operation 11 and is stored in the unit of a frame in operation 12. In operation 13, a luminance component is extracted from the stored image frame in order to generate a luminance image. A high-pass filter is applied to the entire luminance image in operation 14. An edge-enhanced pixel is obtained by combining a pixel passing through the high-pass filter with an original image, thereby generating an improvement image in operation 15. An image reconstruction process is performed in order to reconstruct the original image in operation 16. According to the conventional edge sharpening method, operations 11 through 16 have to be repeated for all pixels in order to perform edge enhancement for the entire image.

The conventional edge sharpening method uses a fixed filter for improving the sharpness of an image. However, due to the use of the fixed filter, characteristics of various sensors cannot be flexibly exploited and the sharpness of an image cannot be improved adaptively according to a change in an external environment.

SUMMARY OF THE INVENTION

The present invention provides an image edge correction apparatus and method whereby a contour portion of an image is appropriately enhanced while minimizing noise in a plane portion of the image in order to improve the sharpness of the image.

The present invention also provides an image edge correction apparatus and method whereby detailed information within an image is first checked and the image is processed based on the checked detailed information in order to efficiently improve output image quality.

According to an aspect of the present invention, there is provided an image edge correction apparatus including an edge information extraction unit extracting edge information of an input image based on luminance change directivity information of the input image and an edge enhancement unit enhancing an edge of the input image by applying different luminance weights to a pixel of interest included in the input image based on the edge information of the input image.

The image edge correction apparatus may further include a blurring image generation unit generating a blurring image by performing blurring processing on the input image.

The edge information extraction unit may include a luminance change directivity information extraction unit generating a region of interest from the input image and extracting the luminance change directivity information with respect to the pixel of interest included in the region of interest and a comparison/classification unit performing comparison and classification on the edge information based on the luminance change directivity information.

The pixel of interest may be located in a center of the region of interest, and the luminance change directivity information may be generated by extracting luminance changes in a horizontal direction, a vertical direction, a left diagonal direction, and a right diagonal direction of the region of interest with respect to the pixel of interest.

The luminance change directivity information extraction unit may extract the luminance change directivity information by summing up two times an absolute value of a difference between luminance values of two pixels located symmetrical with respect to the pixel of interest and a result of subtracting the luminance values of the two pixels from two times a luminance value of the pixel of interest.

The luminance change directivity information extraction unit may select a 3×3-pixel region from a 5×5-pixel region included in the input image, generate the region of interest by applying an average filter to the selected 3×3-pixel region, and extract the luminance change directivity information in the horizontal direction, the vertical direction, the left diagonal direction, and the right diagonal direction of the region of interest, and the comparison/classification unit may compare minimum values of the luminance change directivity information with a first threshold and a second threshold that is greater than the first threshold and classify the edge information of the input image into three levels.

The comparison/classification unit may classify the edge information of the input image as a first level when the luminance change directivity information are less than the first threshold, classify the edge information of the input image as a second level when the minimum value of the luminance change directivity information is less than the second threshold, and classify the edge information of the input image as a third level when the minimum value of the luminance change directivity information is greater than the second threshold.

The edge enhancement unit may apply a luminance weight of 1 to the pixel of interest included in the input image when the edge information of the input image is classified as the first level.

The image edge correction apparatus may further include a blurring image generating a blurring image by performing blurring processing on the input image, wherein the edge enhancement unit may multiply a difference between luminance values of the pixel of interest included in the input image and a pixel of interest included in the blurring image by a first luminance weight and add the luminance value of the pixel of interest included in the blurring image to a result of the multiplication, when the edge information of the input image is classified as the first level.

The edge enhancement unit may add a second luminance weight that is greater than the first luminance weight to the luminance value of the pixel of interest included in the input image when the edge information of the input image is classified as the second level.

The second luminance weight may be generated by dividing a value for enhancing the luminance value of the pixel of interest included in the input image by a dynamic weight that dynamically changes according to a level of the luminance value of the pixel of interest included in the input image.

The dynamic weight may decrease as the luminance value of the pixel of interest included in the input image increases from a lowest level to an intermediate level and increase as the luminance value of the pixel of interest included in the input image increases from the intermediate level to a highest level.

The image edge correction apparatus may further include a blurring image generating a blurring image by performing blurring processing on the input image, wherein the edge enhancement unit may multiply a difference between luminance values of the pixel of interest included in the input image and a pixel of interest included in the blurring image by a third luminance weight that is greater than the second luminance weight and add the luminance value of the pixel of interest included in the blurring image to a result of the multiplication, when the edge information of the input image is classified as the third level.

According to another aspect of the present invention, there is provided an image edge correction method including extracting edge information of an input image based on luminance change directivity information of the input image and enhancing an edge of the input image by applying different luminance weights to a pixel of interest included in the input image based on the edge information of the input image.

The extraction of the edge information may include generating a region of interest from the input image and extracting the luminance change directivity information with respect to the pixel of interest included in the region of interest and performing comparison and classification on the edge information based on the luminance change directivity information.

The pixel of interest may be located in a center of the region of interest, and the luminance change directivity information may be generated by extracting luminance changes in a horizontal direction, a vertical direction, a left diagonal direction, and a right diagonal direction of the region of interest with respect to the pixel of interest.

The extraction of the luminance change directivity information may include extracting the luminance change directivity information by summing up two times an absolute value of a difference between luminance values of two pixels located symmetrical with respect to the pixel of interest and a result of subtracting the luminance values of the two pixels from two times a luminance value of the pixel of interest.

The extraction of the luminance change directivity information may include selecting a 3×3-pixel region from a 5×5-pixel region included in the input image, generating the region of interest by applying an average filter to the selected 3×3-pixel region, and extracting the luminance change directivity information in the horizontal direction, the vertical direction, the left diagonal direction, and the right diagonal direction of the region of interest, and the performing of the comparison and classification may include comparing minimum values of the luminance change directivity information with a first threshold and a second threshold that is greater than the first threshold and classifying the edge information of the input image into three levels.

The performing of the comparison and classification may include classifying the edge information of the input image as a first level when the luminance change directivity information are less than the first threshold, classifying the edge information of the input image as a second level when the minimum value of the luminance change directivity information is less than the second threshold, and classifying the edge information of the input image as a third level when the minimum value of the luminance change directivity information is greater than the second threshold.

A luminance weight of 1 may be applied to the pixel of interest included in the input image when the edge information of the input image is classified as the first level.

The image edge correction method may further include generating a blurring image by performing blurring processing on the input image, wherein a difference between luminance values of the pixel of interest included in the input image and a pixel of interest included in the blurring image may be multiplied by a first luminance weight and the luminance value of the pixel of interest included in the blurring image may be added to a result of the multiplication, when the edge information of the input image is classified as the first level.

A second luminance weight that is greater than the first luminance weight may be added to the luminance value of the pixel of interest included in the input image when the edge information of the input image is classified as the second level.

The second luminance weight may be generated by dividing a value for enhancing the luminance value of the pixel of interest included in the input image by a dynamic weight that dynamically changes according to a level of the luminance value of the pixel of interest included in the input image.

The dynamic weight may decrease as the luminance value of the pixel of interest included in the input image increases from a lowest level to an intermediate level and increase as the luminance value of the pixel of interest included in the input image increases from the intermediate level to a highest level.

The image edge correction method may further include generating a blurring image by performing blurring processing on the input image, wherein a difference between luminance values of the pixel of interest included in the input image and a pixel of interest included in the blurring image may be multiplied by a third luminance weight that is greater than the second luminance weight and the luminance value of the pixel of interest included in the blurring image may be added to a result of the multiplication, when the edge information of the input image is classified as the third level.

BRIEF DESCRIPTION OF THE DRAWINGS

The above and other features and advantages of the present invention will become more apparent by describing in detail an embodiment thereof with reference to the attached drawings in which:

FIGS. 3 and 4 are diagrams for explaining an operation of a luminance change directivity information extraction unit included in the image edge correction apparatus according to an embodiment of the present invention;

DETAILED DESCRIPTION OF THE INVENTION

Figure 1:
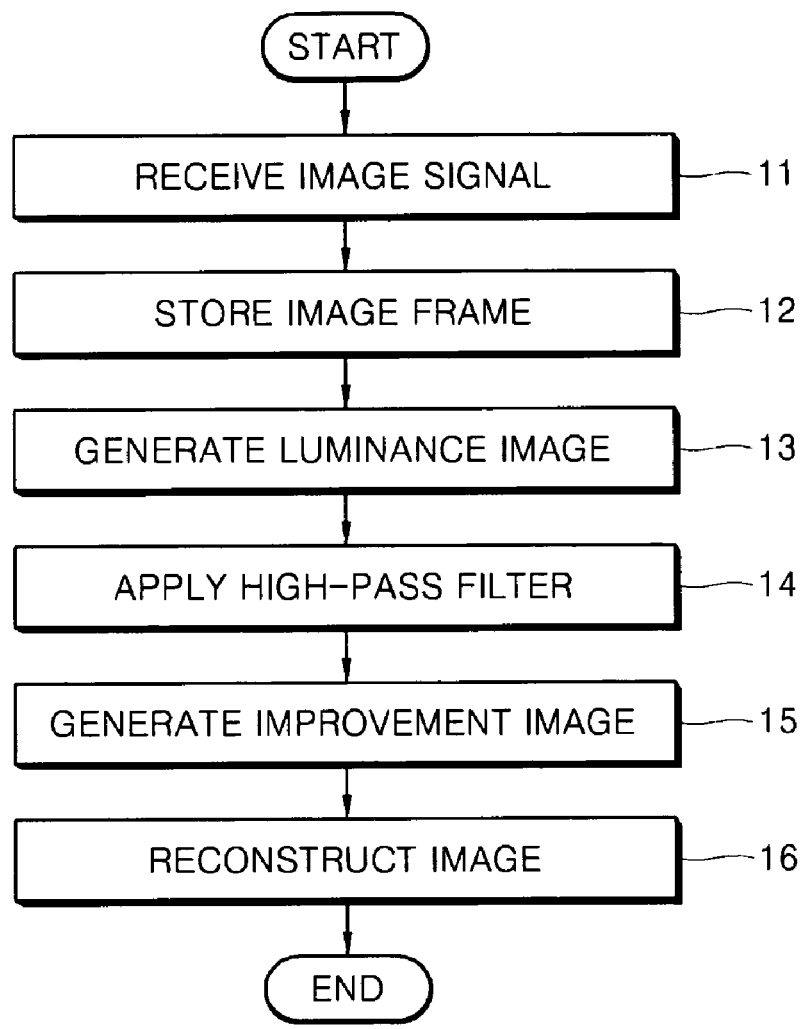
FIG. 1 is a flowchart conceptually illustrating a conventional edge sharpening method for edge enhancement.

Hereinafter, an embodiment of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

Figure 2:
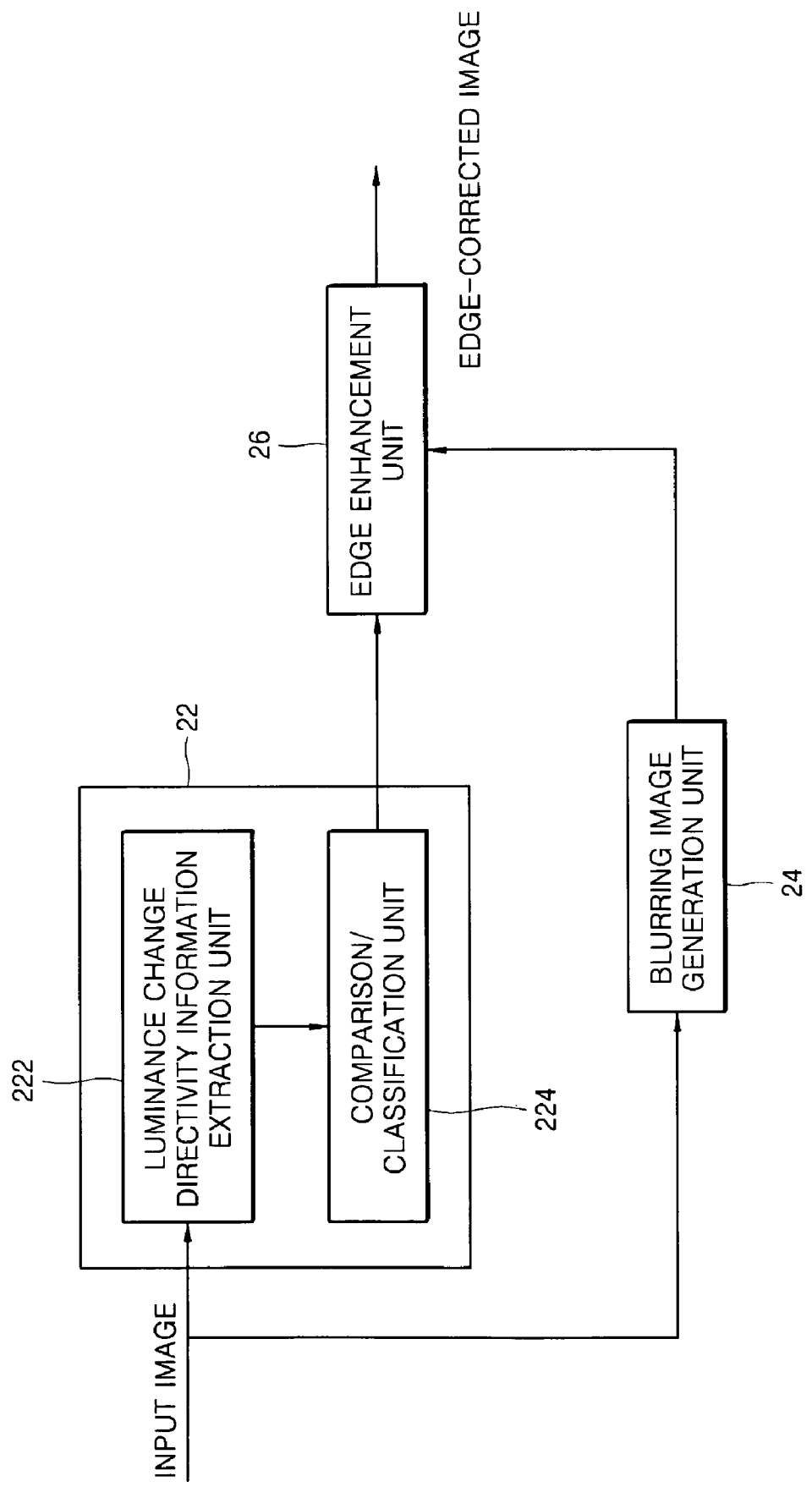
FIG. 2 is a block diagram of an image edge correction apparatus according to an embodiment of the present invention.

FIG. 2 is a block diagram of an image edge correction apparatus according to an embodiment of the present invention.

Referring to FIG. 2, the image edge correction apparatus includes an edge information extraction unit 22 and an edge enhancement unit 26. The image edge correction apparatus may further include a blurring image generation unit 24 as will be described in detail with reference to FIG. 7.

The edge information extraction unit 22 extracts edge information of an input image based on luminance change directivity information in the input image.

Preferably, the edge information extraction unit 22 may include a luminance change directivity information extraction unit 222 and a comparison/classification unit 224.

The luminance change directivity information extraction unit 222 selects a 3×3-pixel region from a 5×5-pixel region included in the input image, applies an average filter to the selected 3×3-pixel region in order to generate a region of interest, and extracts luminance change directivity information in a horizontal direction, a vertical direction, a left diagonal direction, and a right diagonal direction of the generated region of interest with respect to a pixel of interest located in the center of the generated region of interest. The luminance change directivity information extraction unit 222 will be described in more detail with reference to FIGS. 3 and 4.

Selection of 3×3-Pixel Region

FIG. 3 is a diagram for explaining an example of selection of a 3×3-pixel region.

Referring to FIG. 3, a 3×3-pixel region PA2 is selected from a 5×5-pixel region PA1 included in an input image. In this case, P11 corresponds to Y22, P12 corresponds to Y23, P13 corresponds to Y24, P21 corresponds to Y32, P22 corresponds to Y33, P23 corresponds to Y34, P31 corresponds to Y42, P32 corresponds to Y43, and P33 corresponds to Y44.

Generation of Region of Interest

Figure 4:
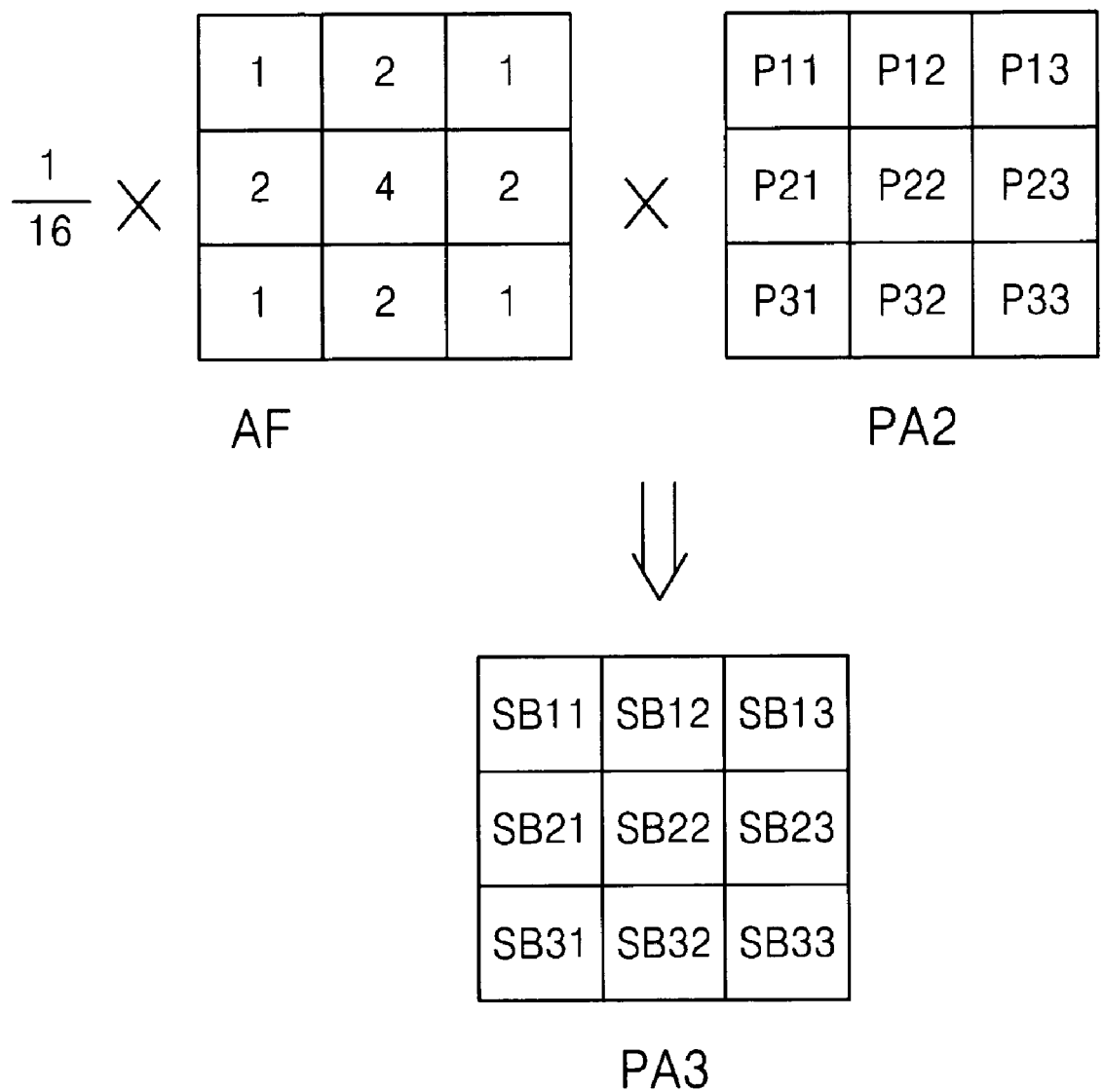

FIG. 4 is a diagram for explaining an example of generation of a region of interest.

Referring to FIG. 4, an average filter (AF) is applied to the selected 3×3-pixel region PA2 in order to generate a 3×3-pixel region of interest PA3. In this case, SB11 corresponds to (P11)/16, SB12 corresponds to 2(P12)/16, SB13 corresponds to (P13)/16, SB21 corresponds to 2(P21)/16, SB22 corresponds to 4(P22)/16, SB23 corresponds to 2(P23)/16, SB31 corresponds to (P31)/16, SB32 corresponds to 2(P32)/16, and SB33 corresponds to (P33)/16.

Extraction of Luminance Change Directivity Information

Figures 5, 6:
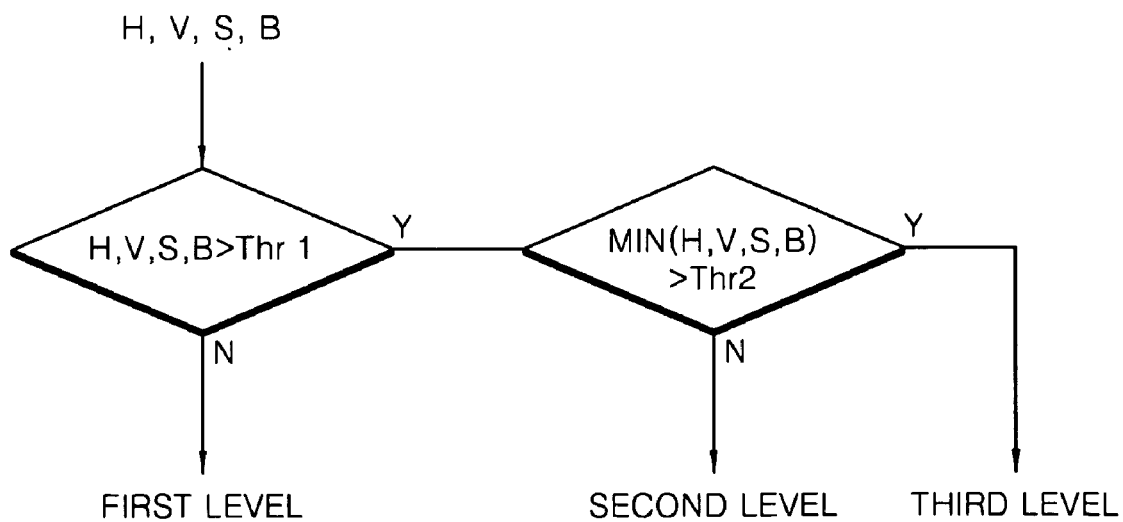
FIG. 5 illustrates luminance change directivity information.
FIG. 6 is a diagram for explaining an operation of comparison/classification unit included in the image edge correction apparatus according to an embodiment of the present invention.

FIG. 5 is a diagram for explaining an example of extraction of luminance change directivity information.

Referring to FIGS. 4 and 5, luminance change directivity information H, V, S, and B in a horizontal direction, a vertical direction, a left diagonal direction, and a right diagonal direction of the generated region of interest PA3 with respect to a pixel of interest SB22 located in the center of the region of interest PA3 are extracted.

Each of the luminance information H, V, S, and B is extracted by summing up 2 times an absolute value of a difference between luminance values of two pixels located symmetrical with respect to the pixel of interest SB22 and a result of subtracting the luminance values of the two pixels from 2 times a luminance value of the pixel of interest SB22. The luminance information H, V, S, and B can be expressed as follows.

$$H = 2|SB21-SB23| + |2SB22-SB21-SB23| \quad (1),$$

where H indicates luminance change directivity information in a horizontal direction.

$$V = 2|SB12-SB32| + |2SB22-SB12-SB32| \quad (2),$$

where V indicates luminance change directivity information in a vertical direction.

$$S = 2|SB13-SB31| + |2SB22-SB13-SB31| \quad (3),$$

where S indicates luminance change directivity information in a left diagonal direction.

$$B = 2|SB11-SB33| + |2SB22-SB11-SB33| \quad (4),$$

where B indicates luminance change directivity information in a right diagonal direction.

The comparison/classification unit 224 compares a minimum value of each of the luminance information H, V, S, and B with a first threshold Thr1 and a second threshold Thr2 that is greater than the first threshold Thr1 in order to classify edge information of the input image into 3 levels, as will be described in more detail with reference to FIG. 6.

FIG. 6 is a diagram for explaining an operation of the comparison/classification unit 224.

Referring to FIG. 6, when all the luminance information H, V, S, and B are less than the first threshold Thr1, the comparison/classification unit 224 classifies the edge information of the input image as a first level. When minimum value MIN(H, V, S, B) of the luminance information H, V, S, and B is less than the second threshold Thr2, the comparison/classification unit 224 classifies the edge information of the input image as a second level. When the minimum value MIN(H, V, S, B) of the luminance information H, V, S, and B is greater than the second threshold Thr2, the comparison/classification unit 224 classifies the edge information of the input image as a third level.

Figure 7:
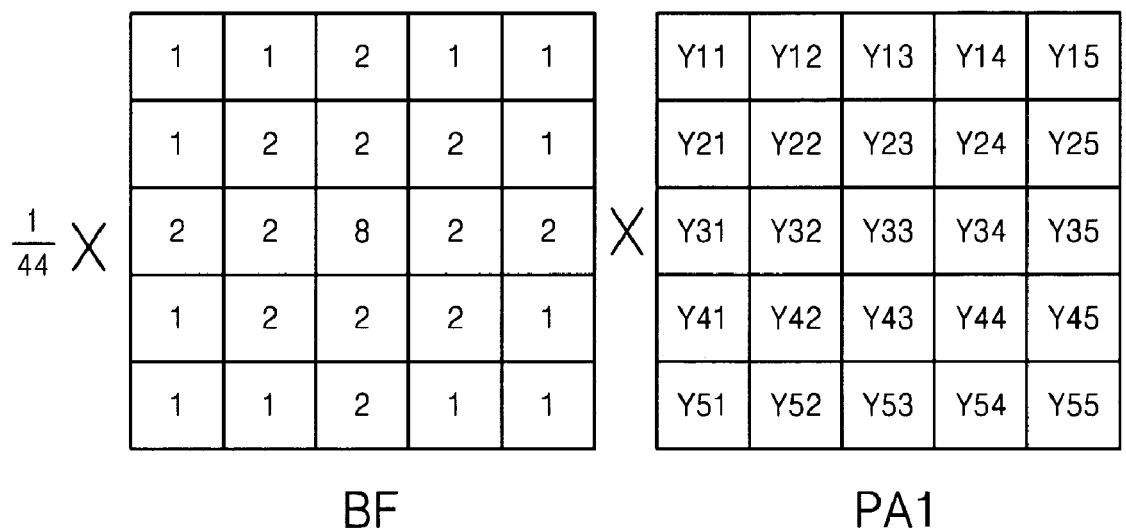
FIG. 7 is a diagram for explaining an operation of a blurring image generation unit included in the image edge correction apparatus according to an embodiment of the present invention.
Figure 7:

Preferably, the image edge correction apparatus according to an embodiment of the present invention may further include the blurring image generation unit 24 for generating a blurring image by performing blurring processing on the input image. FIG. 7 is a diagram for explaining generation of the blurring image.

Referring to FIG. 7, a blurring filter (BF) is applied to the 5×5-pixel region PA1 included in the input image in order to generate a 5×5-pixel blurring image PA4 whose overall luminance is lowered when compared to that of the 5×5-pixel region PA1 included in the input image. However, the BF of FIG. 7 is illustrated by way of example, and a BF having a different value than the BF of FIG. 7 may also be used.

The edge enhancement unit 26 applies different luminance weights to a pixel of interest included in the input image based on the edge information from the comparison/classification unit 224 in order to enhance an edge portion of the input image, as will be described in more detail below.

When Edge Information of Input Image is Classified as First Level

In this case, the edge enhancement unit 26 applies a luminance weight of 1 to the pixel of interest included in the input image. In other words, since all the luminance information H, V, S, and B in a horizontal direction, a vertical direction, a left diagonal direction, and a right diagonal direction are less than the first threshold Thr1, the pixel of interest is located in a plane portion of the input image rather than the edge portion of the input image and thus the edge enhancement unit 26 outputs the pixel of interest without enhancing the luminance of the pixel of interest.

When the edge information of the input image is classified as the first level, the edge enhancement unit 26 multiplies a difference between luminance values of the pixel of interest included in the input image and a pixel of interest included in the blurring image by a first luminance weight and adds the luminance value of the pixel of interest included in the blurring image to the multiplied value, thereby slightly enhancing the luminance of the pixel of interest included in the input image, as can be expressed as follows:

$$Y'33=K1\times(Y33-B33)+B33 \quad (5),$$

where Y'33 indicates the enhanced luminance value of the pixel of interest included in the input image, Y33 indicates the original luminance value of the pixel of interest included in the input image, B33 indicates the luminance value of the pixel of interest included in the blurring image, and K1 indicates the first luminance weight that is a constant.

When Edge Information of Input Image is Classified as Second Level

In this case, the edge enhancement unit 26 adds a second luminance weight K2 that is greater than the first luminance weight K1 to the luminance value Y33 of the pixel of interest included in the input image in order to enhance the luminance value Y33 of the pixel of interest included in the input image.

Preferably, the second luminance weight K2 may be generated by dividing a value for enhancing the luminance of the pixel of interest included in the input image by a dynamic weight that dynamically changes according to a level of the luminance value of the pixel of interest included in the input image, as can be expressed as follows:

$$Y'33=Y33+K2=Y33+EB33/DW \quad (6),$$

where K2 indicates the second luminance weight, EB33 indicates the value for enhancing the luminance of the pixel of interest included in the input image, and DW indicates the dynamic weight.

In the process of generating the second luminance weight K2, an example of enhancement of the luminance of the pixel of interest included in the input image will be described in more detail with reference to FIG. 8.

Figure 8:
FIGS. 8 and 9 are diagrams for explaining an operation of an edge enhancement unit included in the image edge correction apparatus according to an embodiment of the present invention.
Figure 8:

Referring to FIG. 8, an edge boosting filter (EBF) is applied to the 5×5-pixel region PA1 included in the input image in order to enhance the luminance of the pixel of interest included in the input image. In the example illustrated in FIG. 8, EB33 corresponds to 16Y33. An EBF is not limited to the EBF illustrated in FIG. 8.

Figure 9:
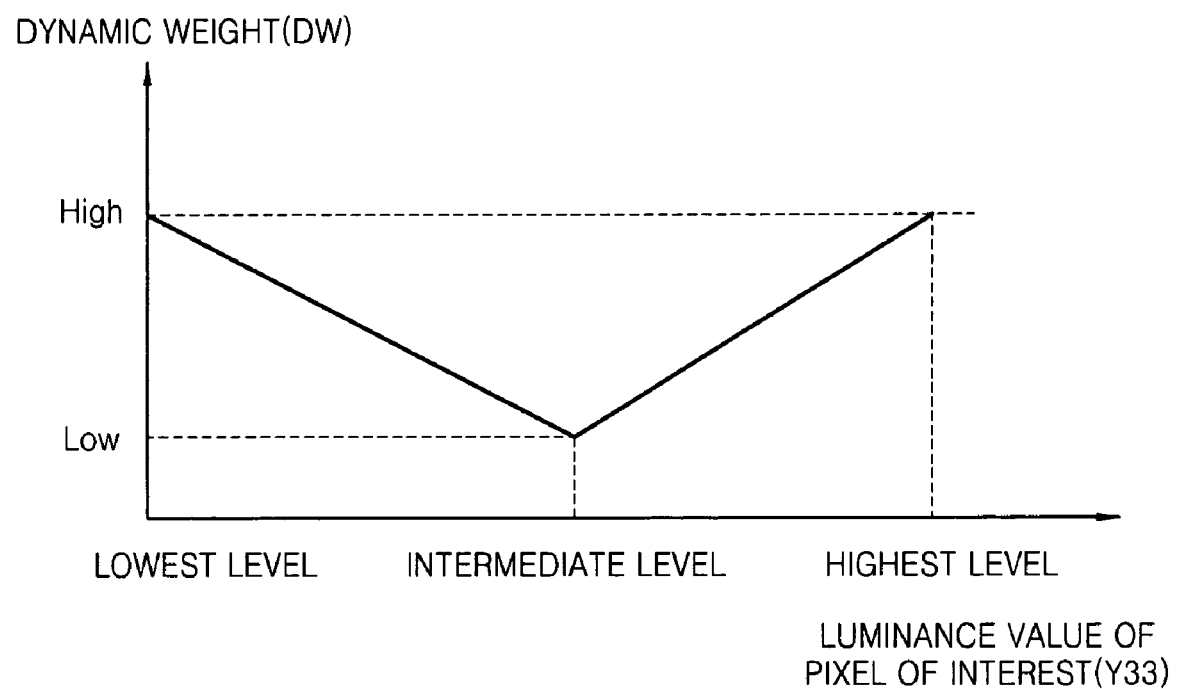

As illustrated in FIG. 9, it is preferable that a dynamic weight DW decrease as the luminance value Y33 of the pixel of interest included in the input image increases from a lowest level to an intermediate level and increase as the luminance value Y33 increases from the intermediate level to a highest level.

When Edge Information of Input Image is Classified as Third Level

In this case, the edge enhancement unit 26 multiplies a difference (Y33−B33) between the luminance values of the pixel of interest included in the input image and the pixel of interest included in the blurring image by a third luminance weight K3 that is greater than the second luminance weight K2 and adds the luminance value B33 of the pixel of interest included in the blurring image to a multiplication result, thereby enhancing the luminance value Y33 of the pixel of interest included in the input image, as can be expressed as follows:

$$Y'33=K3\times(Y33-B33)+B33 \quad (7),$$

where K3 indicates the third luminance weight.

As such, according to the present invention, different weights are applied according to luminance characteristics of a region where an input pixel is located, thereby improving the sharpness of the pixel. In other words, small noise in a region having no edge like a background, e.g., a plane portion, or noise around a large edge in an image is not amplified, thereby improving the sharpness of a pixel. Moreover, by using a blurring image, the overall noise of the image can be reduced and edge information of an input pixel can be expressed well without loss. Furthermore, the precision of each pixel of an image as well as the precision of the entire image are analyzed based on edge information of the pixel and then the sharpness of the image is adjusted on a pixel basis so that a precise portion is made more precise and a dither pattern is reduced, thereby displaying a clear image according to the characteristics of the image.

Figure 10:
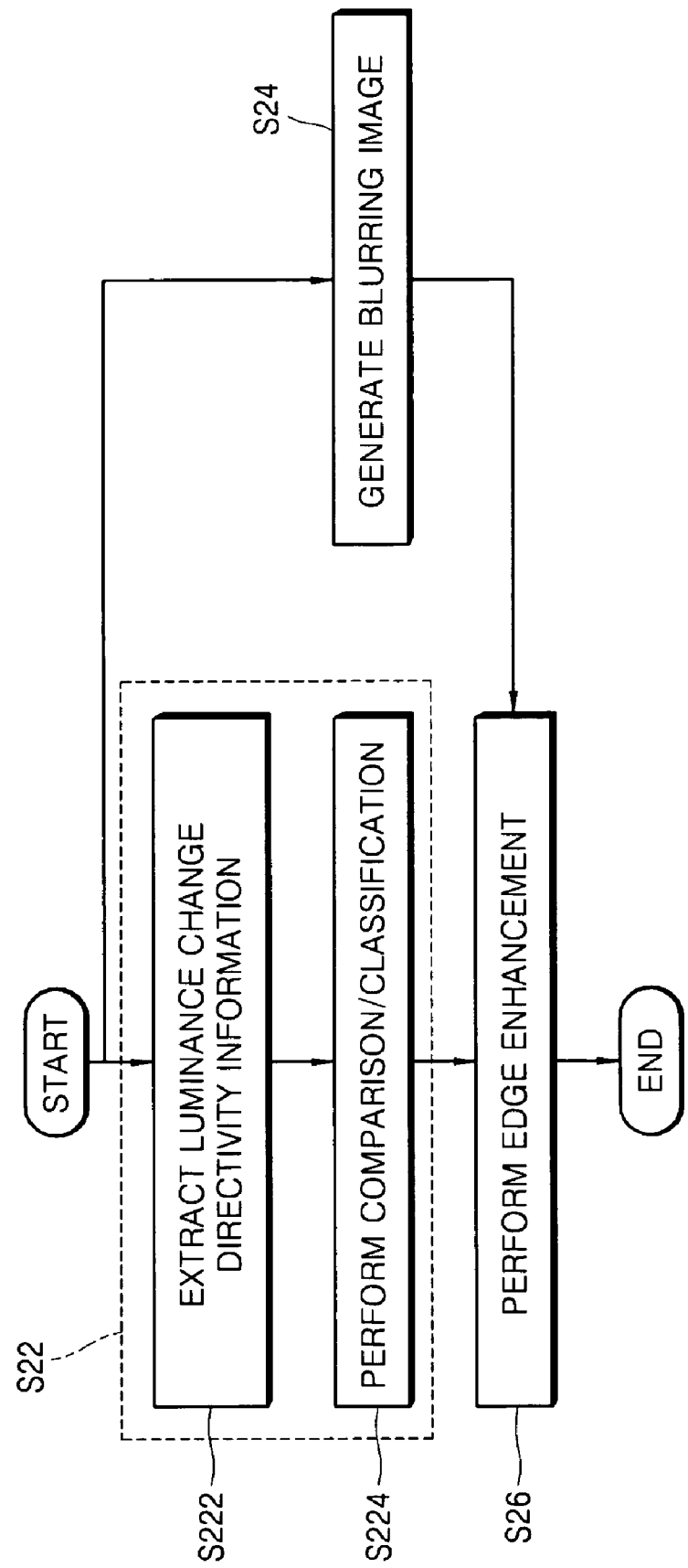
FIG. 10 is a flowchart illustrating an edge correction method according to an embodiment of the present invention.

FIG. 10 is a flowchart illustrating an edge correction method according to an embodiment of the present invention.

Referring to FIG. 10, the edge correction method includes operation S22 including operation S222 of extracting luminance change directivity information and operation S224 of performing comparison/classification, operation S24 of generating a blurring image, and operation S26 of performing edge enhancement.

The principle of the edge correction method according to an embodiment of the present invention is substantially the same as the above-described image edge correction apparatus according to an embodiment of the present invention, and thus a detailed description thereof will be omitted.

As described above, according to the present invention, by appropriately enhancing an edge portion of an image while minimizing noise in a plane portion of the image, the sharpness of the image can be improved.

Moreover, according to the present invention, detailed information within an image is checked and then the image is processed based on the detailed information, thereby efficiently improving output image quality.

While the present invention has been particularly shown and described with reference to an embodiment thereof, it will be understood by those of ordinary skill in the art that various changes in form and detail may be made therein without departing from the spirit and scope of the present invention as defined by the following claims. Accordingly, the disclosed embodiment should be considered in a descriptive sense not in a restrictive sense. The scope of the present invention will be defined by the appended claims, and differences within the scope should be construed to be included in the present invention.

What is claimed is:

1. An image edge correction apparatus comprising:
an edge information extraction unit for extracting edge information of an input image based on luminance change directivity information of the input image, wherein the edge information extraction unit comprises a luminance change directivity information extraction unit for selecting a predetermined pixel region from the input image, generating a region of interest by applying an average filter to the selected predetermined pixel region and extracting the luminance change directivity information with respect to a pixel of interest located in the center of the region of interest; and
an edge enhancement unit for enhancing an edge of the input image by applying different luminance weights to a pixel of interest included in the input image based on the edge information of the input image,
wherein the pixel of interest is located in a center of the region of interest,
wherein the luminance change directivity information extraction unit extracts the luminance change directivity information by summing up two times an absolute value of a difference between luminance values of two pixels located symmetrical with respect to the pixel of interest and an absolute value of a result of subtracting the luminance values of the two pixels from two times a luminance value of the pixel of interest.

2. The image edge correction apparatus of claim 1, further comprising a blurring image generation unit for generating a blurring image by performing blurring processing on the input image.

3. The image edge correction apparatus of claim 1, wherein the edge information extraction unit comprises:
a comparison/classification unit for performing comparison and classification on the edge information based on the luminance change directivity information.

4. The image edge correction apparatus of claim 1,
wherein the luminance change directivity information is generated by extracting luminance changes in a horizontal direction, a vertical direction, a left diagonal direction, and a right diagonal direction of the region of interest with respect to the pixel of interest,
wherein the luminance change directivity information extraction unit:
selects a 3×3-pixel region from a 5×5-pixel region included in the input image;
generates the region of interest by applying an average filter to the selected 3×3-pixel region; and
extracts the luminance change directivity information in the horizontal direction, the vertical direction, the left diagonal direction, and the right diagonal direction of the region of interest; and
wherein the comparison/classification unit:
compares values of the luminance change directivity information with a first threshold and a second threshold that is greater than the first threshold; and
classifies the edge information of the input image into three levels.

5. The image edge correction apparatus of claim 4, wherein the comparison/classification unit:
classifies the edge information of the input image as a first level when all the luminance change directivity information are less than the first threshold;
classifies the edge information of the input image as a second level when the minimum value of the luminance change directivity information is less than the second threshold; and
classifies the edge information of the input image as a third level when the minimum value of the luminance change directivity information is greater than the second threshold.

6. The image edge correction apparatus of claim 5, wherein the edge enhancement unit applies a luminance weight of 1 to the pixel of interest included in the input image when the edge information of the input image is classified as the first level.

7. The image edge correction apparatus of claim 5, further comprising a blurring image generating unit for generating a blurring image by performing blurring processing on the input image,
wherein the edge enhancement unit:
multiplies a difference between luminance values of the pixel of interest included in the input image and a pixel of interest included in the blurring image by a first luminance weight; and
adds the luminance value of the pixel of interest included in the blurring image to a result of the multiplication;
when the edge information of the input image is classified as the first level.

8. The image edge correction apparatus of claim 5,
wherein the edge enhancement unit adds a second luminance weight that is greater than the first luminance weight to the luminance value of the pixel of interest included in the input image,
when the edge information of the input image is classified as the second level.

9. The image edge correction apparatus of claim 8, wherein the second luminance weight is generated by dividing a value for enhancing the luminance value of the pixel of interest included in the input image by a dynamic weight that dynamically changes according to a level of the luminance value of the pixel of interest included in the input image.

10. The image edge correction apparatus of claim 9, wherein the dynamic weight:
decreases as the luminance value of the pixel of interest included in the input image increases from a lowest level to an intermediate level; and
increases as the luminance value of the pixel of interest included in the input image increases from the intermediate level to a highest level.

11. The image edge correction apparatus of claim 5, further comprising a blurring image generating unit for generating a blurring image by performing blurring processing on the input image,
wherein the edge enhancement unit:
multiplies a difference between luminance values of the pixel of interest included in the input image and a pixel of interest included in the blurring image by a third luminance weight that is greater than the second luminance weight; and
adds the luminance value of the pixel of interest included in the blurring image to a result of the multiplication;
when the edge information of the input image is classified as the third level.

12. An image edge correction method comprising:
extracting edge information of an input image based on luminance change directivity information of the input image; and enhancing an edge of the input image by applying different luminance weights to a pixel of interest included in the input image based on the edge information of the input image, wherein extracting the edge information comprises:

selecting a predetermined pixel region from the input image, generating a region of interest by applying an average filter to the selected predetermined pixel region, and extracting the luminance change directivity information with respect to a pixel of interest located in the center of the region of interest, wherein the pixel of interest is located in a center of the region of interest, wherein extracting the luminance change directivity information comprises summing up two times an absolute value of a difference between luminance values of two pixels located symmetrical with respect to the pixel of interest and an absolute value of a result of subtracting the luminance values of the two pixels from two times a luminance value of the pixel of interest.

13. The image edge correction method of claim 12, wherein extracting the edge information comprises:

performing comparison and classification on the edge information based on the luminance change directivity information.

14. The image edge correction method of claim 12, wherein the luminance change directivity information is generated by extracting luminance changes in a horizontal direction, a vertical direction, a left diagonal direction, and a right diagonal direction of the region of interest with respect to the pixel of interest wherein extracting the luminance change directivity information comprises:

selecting a 3×3-pixel region from a 5×5-pixel region included in the input image;

generating the region of interest by applying an average filter to the selected 3×3-pixel region; and extracting the luminance change directivity information in the horizontal direction, the vertical direction, the left diagonal direction, and the right diagonal direction of the region of interest; and wherein performing the comparison and classification comprises:

comparing values of the luminance change directivity information with a first threshold and a second threshold that is greater than the first threshold; and classifying the edge information of the input image into three levels.

15. The image edge correction method of claim 14, wherein performing the comparison and classification further comprises:

classifying the edge information of the input image as a first level when all the luminance change directivity information are less than the first threshold;

classifying the edge information of the input image as a second level when the minimum value of the luminance change directivity information is less than the second threshold; and classifying the edge information of the input image as a third level when the minimum value of the luminance change directivity information is greater than the second threshold.

16. The image edge correction method of claim 15, wherein a luminance weight of 1 is applied to the pixel of interest included in the input image when the edge information of the input image is classified as the first level.

17. The image edge correction method of claim 15, further comprising generating a blurring image by performing blurring processing on the input image, wherein a difference between luminance values of the pixel of interest included in the input image and a pixel of interest included in the blurring image is multiplied by a first luminance weight and the luminance value of the pixel of interest included in the blurring image is added to a result of the multiplication, when the edge information of the input image is classified as the first level.

18. The image edge correction method of claim 15, wherein a second luminance weight that is greater than the first luminance weight is added to the luminance value of the pixel of interest included in the input image when the edge information of the input image is classified as the second level.

19. The image edge correction method of claim 18, wherein the second luminance weight is generated by dividing a value for enhancing the luminance value of the pixel of interest included in the input image by a dynamic weight that dynamically changes according to a level of the luminance value of the pixel of interest included in the input image.

20. The image edge correction method of claim 19, wherein the dynamic weight:

decreases as the luminance value of the pixel of interest included in the input image increases from a lowest level to an intermediate level; and increases as the luminance value of the pixel of interest included in the input image increases from the intermediate level to a highest level.

21. The image edge correction method of claim 15, further comprising generating a blurring image by performing blurring processing on the input image, wherein a difference between luminance values of the pixel of interest included in the input image and a pixel of interest included in the blurring image is multiplied by a third luminance weight that is greater than the second luminance weight and the luminance value of the pixel of interest included in the blurring image is added to a result of the multiplication, when the edge information of the input image is classified as the third level.

* * * * *